United States Patent [19]

Busch

[11] 4,346,746

[45] Aug. 31, 1982

[54] ROTARY CUTTER LATHE TOOL

[76] Inventor: Louis M. Busch, 74 Cherry La., Macungie, Pa. 18062

[21] Appl. No.: 176,761

[22] Filed: Aug. 11, 1980

[51] Int. Cl.³ .............................................. B27F 1/08
[52] U.S. Cl. .................................................... 145/115
[58] Field of Search ........................................ 145/115

[56] References Cited

U.S. PATENT DOCUMENTS

| 20,866 | 7/1858 | Davies | 145/115 |
| 181,594 | 8/1876 | Rauh | 145/115 |
| 1,145,237 | 7/1915 | Finney | 145/115 |
| 1,538,987 | 5/1925 | Gullholm | 145/115 |

*Primary Examiner*—Stephen G. Kunin
*Assistant Examiner*—J. T. Zatarga
*Attorney, Agent, or Firm*—Ruth Moyerman

[57] ABSTRACT

A rotating cutter cuts rough lathe stock into finished dowels sized to the desired dimension. Collars of predetermined length vary the distance between the rotating cutter and the tool. The body of the tool opposes the thrust of the revolving work piece away from the rotating cutting blade and supports stock of small diameter which is flexible and may otherwise bow or whip as it revolves on the lathe between the lathe headstock and tailstock. By twisting the tool, dowels may be finished undersize as needs demand.

3 Claims, 2 Drawing Figures

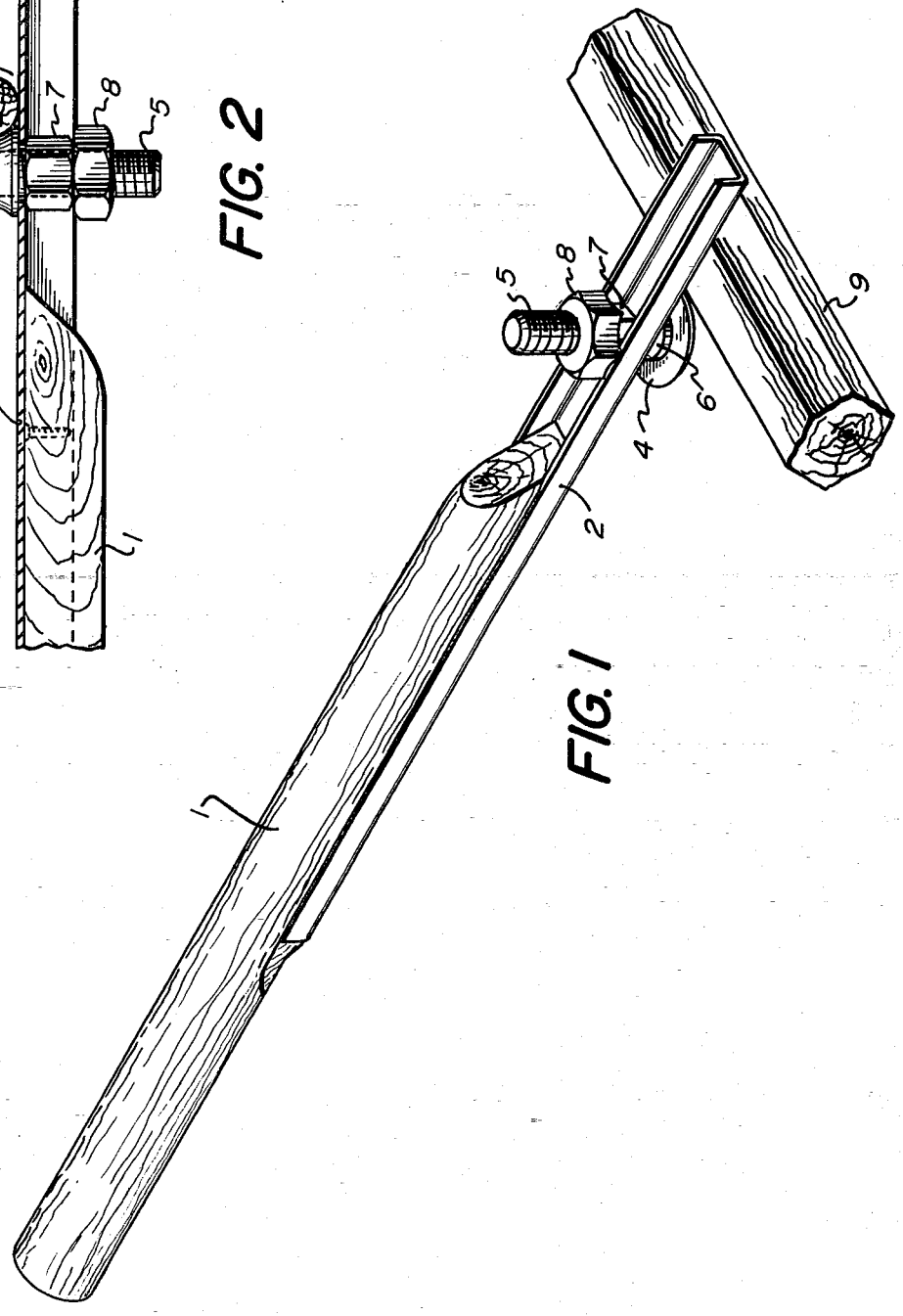

ROTARY CUTTER LATHE TOOL

BACKGROUND OF THE INVENTION

This invention relates to a wood lathe tool used to cut dowels of small diameter.

The rotating cutter blade provides the cabinet-maker, furniture repairman and hobbyist with a solution to a problem unsolved since the power wood lathe began to be widely used in shops and homes. Namely, how can a length of dowel of small diameter be quickly and easily turned on a wood lathe without the use of expensive equipment, workpiece supports or traditional cutters that chatter, leave a rough finish, are difficult to master and all too often gouge and break the dowel before it is completed?

SUMMARY OF THE INVENTION

The rotary cutter blade is the solution. It turns as it cuts, taking up much of the shock during the roughing out stage in which the square corners of the workpiece are rounded off. In its second finishing mode, the rotary cutter's round cutting edge resists chattering and gouging and rotates with the cutting edge continuously in contact with the work piece and finishing the final surface with a shearing action that leaves the completed dowel smooth in appearance and not requiring any sanding or other surface-finishing step, but ready to use as it comes off the lathe.

The object of the invention is to provide a lathe tool with a novel rotary cutter that solves many mechanical problems inherent in traditional stationary cutting edge tools; problems which heretofore have rendered them useless in turning small diameter dowels possessing any useful length to uniform thickness and surface finish because of gouging, chatter, and breakage of the workpiece.

Another object of the invention is to provide a simple means of making one's own dowels out of any specific wood or other relatively soft material not ordinarily available for sale in standard sized stock or under-sized stock for use in special application where standard dowel sizes and materials are unsatisfactory.

Still another object of the invention is to allow its user freedom to quickly set up standard lathes without the addition of any tool rests or special accessories which would lengthen set-up time, require tedious, practiced adjustment, and add to the cost of making one's own dowels.

Another object of the invention is to utilize a single rotating cutter to perform both the roughing out of the workpiece and the finish cutting to the desired cross-section size.

BRIEF DESCRIPTION OF THE DRAWINGS

In the accompanying drawings forming a part of this specification the invention is illustrated hereby:

FIG. 1 is an isometric view of an embodiment of the rotary cutter lathe tool invention in its roughing out mode.

FIG. 2 is a side-view of part of the embodiment of FIG. 1 showing the embodiment inverted in its finish cutting mode.

DETAILED DESCRIPTION OF THE INVENTION

The novel rotary cutter lathe tool invention referenced with particularity to illustrations of the embodiment is as follows:

The operative cutting edge of the invention is generally frustum-shaped cutter 4. Cutter 4 is circular in cross section with one beveled side which revolves around its axis on a threaded bolt 5. Nut 7 secures bolt 5 to the body of the tool 2 and nut 8 locks bolt 5 in its desired location. The wooden handle 1 is secured by wood screws 3 to the body of the tool 2 which shape is a channel in cross section and which inside cross-dimension snugly fits nut 7 and milled surfaces on one side of handle 1.

A concavo-concave shaped collar 6 rotates freely around bolt 5 and provides the desired stand-off distance between the cutting edge of rotary cutter 4 and tool body 2 and regulates the finish dimension of the workpiece 10.

To change the finished dimension of the workpiece, the slotted bolt 5 is removed from tool body and collar 6 is replaced with a longer or shorter collar which length is equal to the desired finished dimension of the workpiece. Ordinary tools are utilized to quickly make this change. Bolt 5 is locked in place with enough clearance to permit rotary cutter 4 and collar 6 to turn freely.

Rotary cutter 4 is utilized firstly to round off the corners of a square or polygonal workpiece 9 as illustrated in FIG. 1 as it turns between centers in an unmodified lathe and secondly, after turning the tool over 180 degrees as illustrated in FIG. 2, to cut and shear away material of the workpiece 10 to its smooth finished dimension.

Tool body 2 furnishes all the required support to the workpiece as rotary cutter 4 cuts away the corners of workpiece 9; and as rotary cutter 4 shears and trims workpiece 10 to its final smooth finished dimension. The invention is hand-held against the workpiece during the cutting operation without any tool rest required and is moved laterally across the workpiece from lathe center to center until the desired cutting action is completed.

Tilting the tool slightly during rounding of workpiece 9 shown in FIG. 1 assists in the rapid removal of material from the workpiece and spins rotary cutter 4. In order to cut the workpiece undersize and less than the predetermined dimension of collar 6, the tool is tilted slightly during the finish cutting mode shown in FIG. 2. Inasmuch as cutter 4 presents a cutting edge in the shape of an arc in a plane tangent to the round cross-section of workpiece 10 it cuts the small rod-dimensioned workpiece 10 smoothly as the workpiece rotates against collar 6 and tool body 2 without chatter or gouging of workpiece 10.

Nothwithstanding the above description, example, and embodiment they are to be interpreted as illustrative, and not in a limiting sense inasmuch as modifications will occur to those skilled in the art without departing from the spirit and scope of the invention.

I claim:

1. A rotary cutting lathe tool comprising:
   (a) an elongated combination tool support body and work piece guide means, the work piece engaging side of which is generally planar;
   (b) hand held handle means attached to and forming an extension of one end of said tool body;

(c) bearing means mounted at a right angle on said tool body from said planar side intermittent said tool support ends, the portion of said tool body extending from said bearing to said tool body other end forming said work piece guide means;

(d) a concavo-concave shaped collar including a generally planar top and bottom journalled on said bearing; and, (e) a frustum-shaped blade rotatably mounted transversely on said bearing above said collar, said blade, collar and guide means forming a die for the circular shaping of a lathe held, and turning, work piece.

2. The rotary cutting tool of claim 1 wherein said combination tool support body and work piece guide means are channel-shaped in cross section.

3. The rotary cutting tool of claim 1 wherein said bearing means is adjustably bolted to said tool body.

* * * * *